United States Patent
Yoon

(10) Patent No.: US 9,210,770 B2
(45) Date of Patent: Dec. 8, 2015

(54) LIGHTING CONTROL SYSTEM

(71) Applicant: LG INNOTEK CO., LTD., Seoul (KR)

(72) Inventor: Jae Hun Yoon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 208 days.

(21) Appl. No.: 13/868,767

(22) Filed: Apr. 23, 2013

(65) Prior Publication Data

US 2014/0049166 A1 Feb. 20, 2014

(30) Foreign Application Priority Data

Aug. 16, 2012 (KR) .......................... 10-2012-0089379

(51) Int. Cl.
*H05B 37/02* (2006.01)
*H05B 33/08* (2006.01)

(52) U.S. Cl.
CPC ............ *H05B 37/02* (2013.01); *H05B 33/0851* (2013.01); *H05B 37/0218* (2013.01); *Y02B 20/46* (2013.01)

(58) Field of Classification Search
CPC ............... H05B 37/02; H05B 37/0218; H05B 33/0851; H05B 33/0854; Y02B 20/46
See application file for complete search history.

(56) References Cited

U.S. PATENT DOCUMENTS

| 7,239,231 | B2 * | 7/2007 | Tsukamoto | 340/438 |
| 2011/0109239 | A1 * | 5/2011 | Kojima | 315/250 |
| 2013/0229113 | A1 * | 9/2013 | Toda et al. | 315/152 |
| 2014/0055040 | A1 * | 2/2014 | Nishigaki et al. | 315/152 |
| 2014/0117856 | A1 * | 5/2014 | Cho | 315/149 |

* cited by examiner

*Primary Examiner* — Patrick O'Neill
(74) *Attorney, Agent, or Firm* — Ked & Associates, LLP

(57) ABSTRACT

Disclosed is a lighting control system including an object lighting control device and at least one reference lighting control device. The object lighting control device generates an object brightness control signal to control an object brightness of an object lighting device provided in an object district using a sensed result of an object illuminance around the object lighting device as well as reference data. The reference lighting control device generates a reference brightness control signal to control a reference brightness of a reference lighting device provided in a reference district using a sensed result of a reference illuminance around the reference lighting device, and transmits at least one of the reference illuminance and the reference brightness as the reference data to the object lighting control device in response to a request of the object lighting control device.

20 Claims, 11 Drawing Sheets

LIGHTING CONTROL SYSTEM

CROSS REFERENCE TO RELATED APPLICATION

This application claims priority under 35 U.S.C. §119 to Korean Patent Application No. 10-2012-0089379, filed in Korea on 16 Aug. 2012, which is hereby incorporated in its entirety by reference as if fully set forth herein.

TECHNICAL FIELD

Embodiments relate to a lighting control system.

BACKGROUND

In general, conventional lighting control systems to control lighting devices, such as street lights, are designed to sense an illuminance around a lighting device using an illuminance sensor (not shown), and thereafter to control the lighting device according to the sensed illuminance.

The illuminance sensor, however, may fail to accurately sense an illuminance around the lighting device if a light receiving area thereof is reduced or covered by foreign materials, such as fallen leaves, bird guano, dust, etc. This may cause a lighting device, such as a street light, to malfunction, by, for example, turning on before sunset and failing to turn off after sunrise, thereby shortening lifespan and unnecessarily consuming power. In addition, removal of foreign materials from the illuminance sensor may require frequent cleaning of the illuminance sensor, which may increase maintenance/repair costs of the lighting device.

SUMMARY

Embodiments provide a lighting control system, which may more accurately control lighting devices without being influenced by foreign materials.

In one embodiment, a lighting control system includes an object lighting control device that generates an object brightness control signal to control an object brightness of an object lighting device provided in an object district using a sensed result of an object illuminance around the object lighting device and using reference data, and at least one reference lighting control device that generates a reference brightness control signal to control a reference brightness of a reference lighting device provided in a reference district using a sensed result of a reference illuminance around the reference lighting device, and that transmits at least one of the reference illuminance and the reference brightness as the reference data to the object lighting control device in response to a request of the object lighting control device.

The object lighting control device may calibrate at least one of the object illuminance and the object brightness using at least one of an illuminance comparison result between the object illuminance and the reference illuminance and a brightness comparison result between the reference brightness and the object brightness, and the object lighting control device may generate the object brightness control signal using at least one of the calibrated object illuminance and object brightness.

The object lighting control device may calibrate the object illuminance using the reference illuminance when the illuminance comparison result shows that a difference between the object illuminance and the reference illuminance diverges from a first allowable deviation range.

The object lighting control device may calibrate the object illuminance by performing the following calculation at least one time until a deviation between an average value of the object illuminance and the reference illuminance and the reference illuminance enters the first allowable deviation range;

$$S_K = \frac{(S_{K-1} + S_A)}{2}$$

(where, K is a positive integer of 1 or more, which corresponds to the implementation number of the above calculation and denotes a calibration number, $S_K$ denotes the calibrated object illuminance, and $S_0(K=1)$ is the object illuminance to be calibrated, and $S_A$ denotes the reference illuminance).

The object lighting control device may calibrate the object brightness using the reference brightness if the brightness comparison result shows that a difference between the object brightness and the reference brightness diverges from a second allowable deviation range.

The object lighting control device may calibrate the object brightness by performing the following calculation at least one time until a difference between the calibrated object brightness and the reference brightness enters the second allowable deviation range;

$$B_M = B_{M-1} - \frac{(B_{M-1} - B_A)}{2}$$

(where, M is a positive integer of 1 or more, which corresponds to the implementation number of the above calculation and denotes a calibration number, $B_M$ denotes the calibrated object illuminance, $B_0(M=1)$ denotes the object brightness to be calibrated, and $B_A$ denotes the reference brightness).

The at least one reference lighting control device may include a plurality of reference lighting control devices, and the object lighting control device may calibrate the object illuminance using an average value of a plurality of reference illuminances sensed by the plurality of reference lighting control devices.

The at least one reference lighting control device may include a plurality of reference lighting control devices, and the object lighting control device may calibrate the object brightness using an average value of a plurality of reference brightnesses output from the plurality of reference lighting control devices.

The at least one reference lighting control device may include a plurality of reference lighting control devices, and the object lighting control device may calibrate the object illuminance using an average value of highest-frequency reference illuminances among a plurality of reference illuminances sensed by the plurality of reference lighting control devices.

The at least one reference lighting control device may include a plurality of reference lighting control devices, and the object lighting control device may calibrate the object brightness using an average value of highest-frequency reference brightnesses among a plurality of reference brightnesses output from the plurality of reference lighting control devices.

The object lighting control device may transmit a lighting control request signal in response to at least one of the illuminance comparison result and the brightness comparison result, and the reference lighting control device may transmit the reference brightness control signal as the object brightness control signal to the object lighting device in response to the lighting control request signal.

The object lighting control device may transmit an inherent identification signal of the reference lighting control device to the object lighting device when transmitting the lighting control request signal to the reference lighting control device, and wherein the object lighting device may allow control of the reference lighting control device that is recognized based on the identification signal.

The object lighting control device may include an object illuminance sensing unit configured to sense the object illuminance, an object control unit configured to generate the object brightness control signal using the sensed object illuminance and the reference data, and an object communication unit configured to transmit the object brightness control signal to the object lighting device.

The object lighting control device may further include an object signal conversion unit that amplifies the object illuminance sensed by the object illuminance sensing unit and convert a form of the object illuminance into a form of voltage or frequency and that outputs the converted object illuminance, and the object control unit may generate the object brightness control signal using the converted object illuminance and the reference data.

The object control unit may generate the object brightness control signal in the form of a pulse width modulation signal.

The reference lighting control device may include a reference illuminance sensing unit configured to sense the reference illuminance, a reference control unit configured to generate the reference brightness control signal using the sensed reference illuminance, and a reference communication unit configured to transmit the reference brightness control signal to the reference lighting device.

The reference lighting control device may further include a reference signal conversion unit that amplifies the reference illuminance sensed by the reference illuminance sensing unit and converts a form of the reference illuminance into a form of voltage or frequency and that outputs the converted reference illuminance, and the reference control unit may generate the reference brightness control signal using the converted reference illuminance. The object lighting control device may further include a storage unit configured to store the implementation number of calibration of at least one of the object illuminance and the object brightness.

The lighting control system may manage the object lighting device using the implementation number of calibration stored in the storage unit.

In another embodiment, a lighting control system includes an object lighting control device that generates a lighting control request signal using a sensed result of an object illuminance around an object lighting device provided in an object district and using reference data, and a reference lighting control device that generates a reference brightness control signal to control a reference brightness of a reference lighting device provided in a reference district using a sensed result of a reference illuminance around the reference lighting device, and that outputs the reference brightness control signal as an object brightness control signal to control a brightness of the object lighting device to the object lighting control device in response to the lighting control request signal received from the object lighting control device.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Hereinafter, embodiments will be described to help understanding of the present disclosure with reference to the accompanying drawings. However, the embodiments may be embodied in many alternate forms and should not be construed as limited to the embodiments set forth herein. Rather, these embodiments are provided so that this disclosure will be thorough and complete and will fully convey the scope to those skilled in the art.

Figure 1:
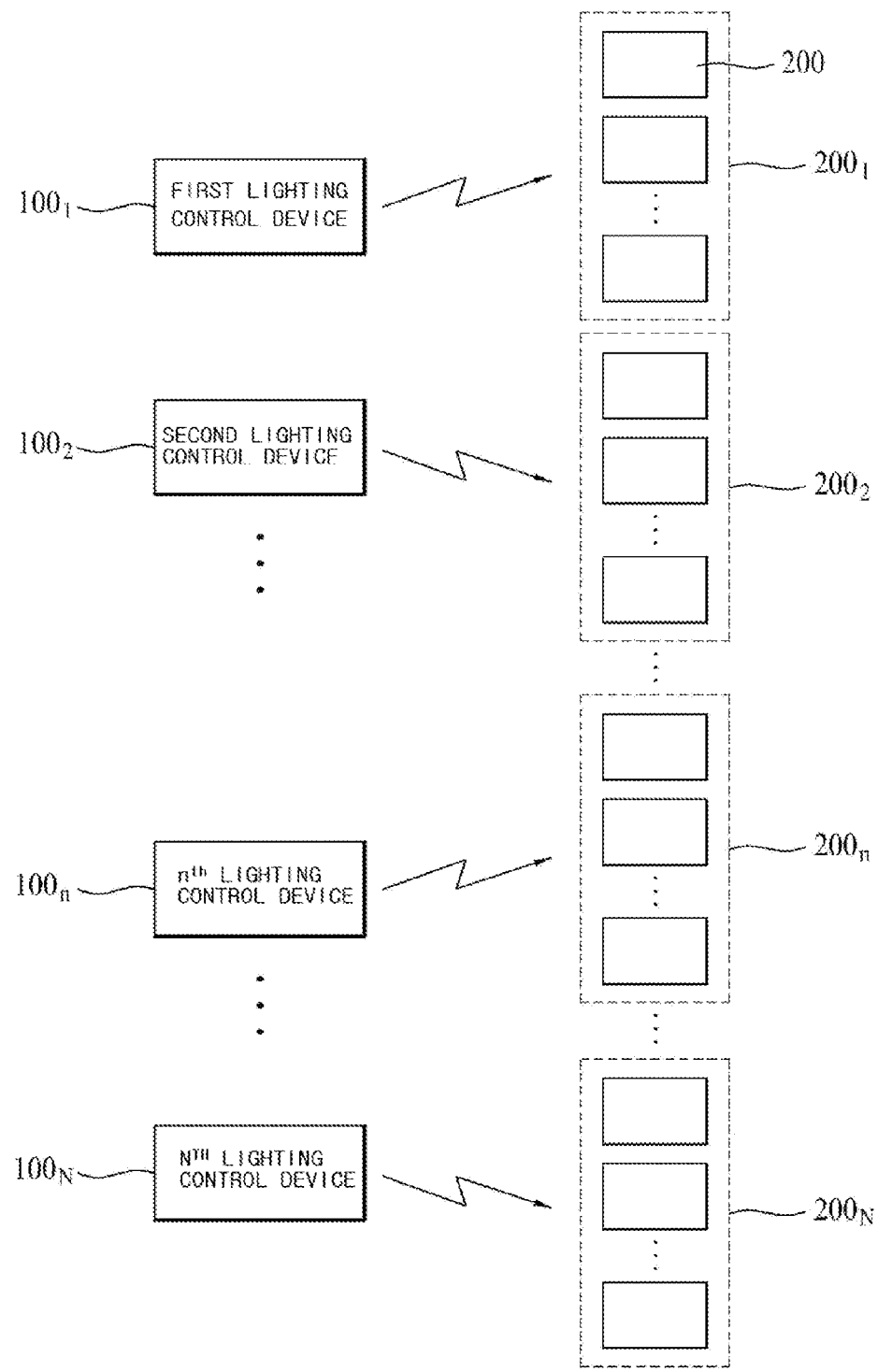
FIG. 1 is a layout diagram of a lighting control system and a lighting device according to an embodiment.

FIG. 1 is a layout diagram of a lighting control system and a lighting device according to an embodiment.

Referring to FIG. 1, the lighting control system according to the embodiment is comprised of first to $N^{th}$ lighting control devices $100_1$ to $100_N$. Here, N is a positive integer of 1 or more. The first to $N^{th}$ lighting control devices $100_1$ to $100_N$ are respectively allotted to first to $N^{th}$ districts $200_1$ to $200_N$. Each of the first to $N^{th}$ districts $200_1$ to $200_N$ is provided with at least one lighting device 200. The at least one lighting device 200 provided in each district is controlled by first to $N^{th}$ brightness control signals $L_1$ to $L_N$ which are generated respectively by the corresponding lighting control devices $100_1$ to $100_N$.

That is, the first lighting control device $100_1$ is allotted to the first district $200_1$, and at least one lighting device 200 provided in the first district $200_1$ is controlled by the first brightness control signal $L_1$. Similarly, the $n^{th}$ lighting control device $100_n$ is allotted to the $n^{th}$ district $200_n$, and at least one lighting device 200 provided in the $n^{th}$ district $200_N$ is controlled by the $n^{th}$ brightness control signal $L_N$. Here, $1 \leq n \leq N$.

Hereinafter, in the lighting control system exemplarily shown in FIG. 1, a lighting control device that is an object of interest among the first to $N^{th}$ lighting control devices $100_1$ to $100_N$ is referred to as 'object lighting control device $100_x$' (here, $1 \leq X \leq N$), and another lighting control device that is referred to by the object lighting control device $100_X$ is referred to as 'reference lighting control device $100_Y$' (here, $X \neq Y$, $1 \leq Y \leq N$).

To prevent the lighting device 200 from being abnormally controlled due to a sensing error of an illuminance around the lighting device 200, the sensing error being caused by foreign materials, such as, for example, fallen leaves, bird guano, and/or dust, the object lighting control device $100_X$ may control the lighting device 200 as follows by referring to the reference lighting control device $100_Y$.

Hereinafter, a configuration and operation with regard to the case in which the object lighting control device $100_X$ refers to the reference lighting control device $100_Y$ and the reference lighting control device $100_Y$ is referred to by the object lighting control device $100_X$ will be described. Of course, the object lighting control device $100_X$ and the reference lighting control device $100_Y$ may have the same configuration and may perform the same operation.

Figure 2:
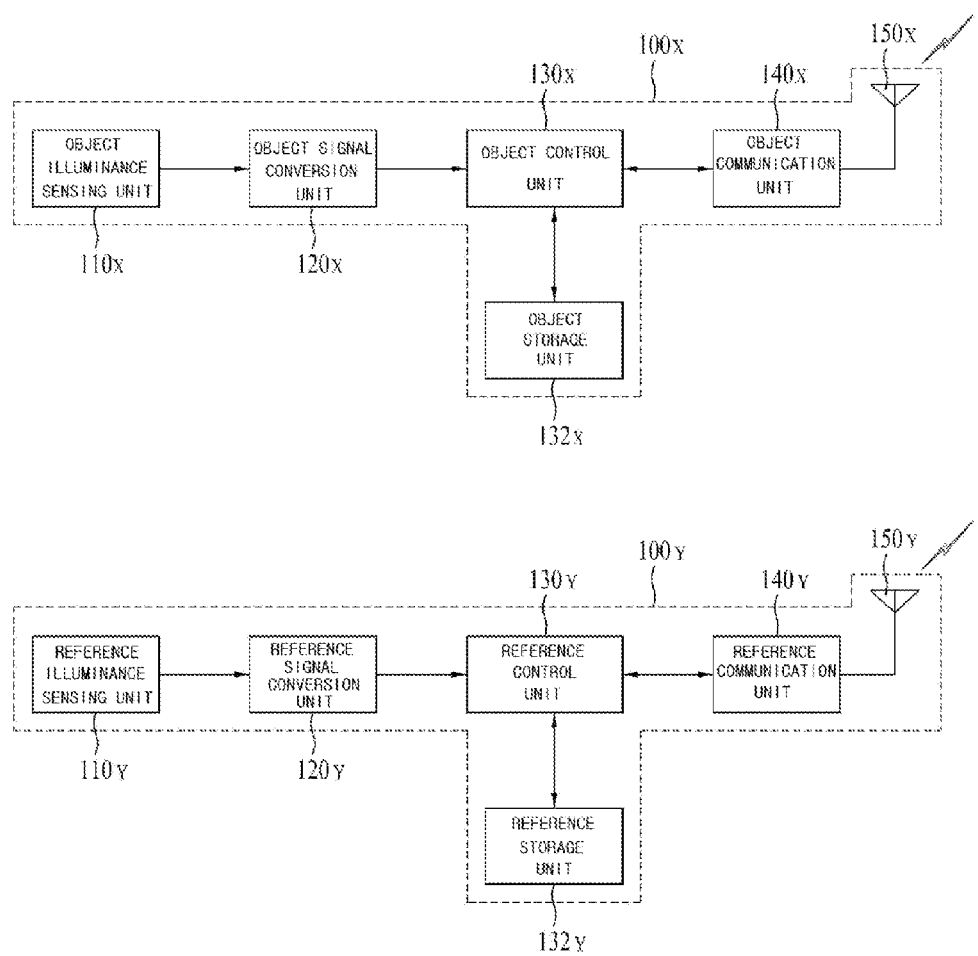
FIG. 2 is a schematic block diagram of a lighting control system according to an embodiment.

FIG. 2 is a schematic block diagram of a lighting control system according to an embodiment, which includes the object lighting control device $100_X$ and the reference lighting control device $100_Y$.

The object lighting control device $100_X$ as exemplarily shown in FIG. 2 may include an object illuminance sensing unit $110_X$, an object signal conversion unit $120_X$, an object control unit $130_X$, an object communication unit $140_X$, and an object antenna $150_X$, and may further include an object storage unit $132_X$.

The object illuminance sensing unit $110_X$ serves to sense an illuminance (hereinafter referred to as 'object illuminance') around at least one lighting device 200 (hereinafter referred to as 'object lighting device') that is provided in the $X^{th}$ district $200_X$ (hereinafter referred to as 'object district') among the first to $N^{th}$ districts $200_1$ to $200_N$. Here, since the object lighting control device $100_X$ is located close to the object lighting device 200, it is assumed that that an illuminance sensed by the object illuminance sensing unit $110_X$ included in the object lighting control device $100_X$ substantially equals an illuminance around the object lighting device 200 provided in the object district $200_X$. For example, the object illuminance sensing unit $110_X$ may function to change light into electricity and to output an object illuminance signal corresponding to the electricity.

The object signal conversion unit $120_X$ may convert the form of the object illuminance transmitted from the object illuminance sensing unit $110_X$ into voltage or frequency by amplifying the object illuminance, and output the object illuminance having the converted form to the object control unit $130_X$. Here, the original form of the object illuminance may be voltage.

The object control unit $130_X$ generates a brightness control signal (hereinafter referred to as 'object brightness control signal') using reference data and an object illuminance output from the object signal conversion unit $120_X$. Here, the reference data includes at least one of a reference illuminance and a reference brightness. The reference illuminance means an illuminance around the lighting device (hereinafter referred to as 'reference lighting device') provided in at least one district $200_Y$ (hereinafter referred to as 'reference district'), different from the object district $200_X$, among the first to $N^{th}$ districts $200_1$ to $200_N$. In addition, the reference brightness means a brightness (or luminance) of the reference lighting device 200.

Additionally, according to an embodiment, the object control unit $130_X$ calibrates at least one of an object illuminance and an object brightness using at least one of an illuminance comparison result and a brightness comparison result. Here, the object brightness means a brightness of the object lighting device 200. In addition, the illuminance comparison result means a result of comparing an object illuminance with a reference illuminance, and the brightness comparison result means a result of comparing an object brightness with a reference brightness. This comparison may be performed by the object control unit $130_X$.

The object control unit $130_X$ may further function to detect the level of an object illuminance output from the object signal conversion unit $120_X$, and to generate a Pulse Width Modulation (PWM) object brightness control signal having a pulse width (or duty) corresponding to the detected level. In this case, the aforementioned object brightness control signal may take the form of digital data corresponding to a pulse duty ratio. Conversion from a PWM signal into digital data may be performed by the object control unit $130_X$ via a pre-stored algorithm.

If the object lighting device 200 is implemented by Light Emitting Diodes (LEDs), a brightness degree of the LEDs may vary according to a duty ratio of the PWM object brightness control signal.

Hereinafter, although the object lighting control device $100_X$ is connected in a wireless manner to the object lighting device 200 provided in the object district $200_X$ and/or the reference lighting control device $100_Y$ through the object communication unit $140_X$ and the object antenna $150_X$, the embodiment is not limited thereto. That is, the object lighting control device $100_X$ may be connected in a wired manner to the object lighting device 200 provided in the object district $200_X$ and/or the reference lighting control device $100_Y$. If the object lighting control device $100_X$ is connected in a wired manner to the object lighting device 200, the object antenna $150_X$ is omitted.

For example, the object communication unit $140_X$ may transmit an object brightness control signal, generated by the object control unit $130_X$, to the object lighting device 200 through the object antenna $150_X$ using short-range wireless communication, such as RF wireless communication or Zig-Bee wireless communication.

The reference lighting control device $100_Y$ may include a reference illuminance sensing unit $110_Y$, a reference signal conversion unit $120_Y$, a reference control unit $130_Y$, a reference communication unit $140_Y$, and a reference antenna $150_Y$, and may further include a reference storage unit $132_Y$. Here, to distinguish between the object lighting control device $100_X$ and the reference lighting control device $100_Y$, although the reference illuminance sensing unit $110_Y$, the reference signal conversion unit $120_Y$, the reference control unit $130_Y$, the reference communication unit $140_Y$, the reference antenna $150_Y$, and the reference storage unit $132_Y$ differ in name from the object illuminance sensing unit $110_X$, the object signal conversion unit $120_X$, the object control unit $130_X$, the object communication unit $140_X$, the object antenna $150_X$, and the object storage unit $132_X$, they may perform the same functions.

The reference illuminance sensing unit $110_Y$ serves to sense a reference illuminance around at least one reference lighting device 200 that is provided in the reference district $200_Y$ among the first to $N^{th}$ districts $200_1$ to $200_N$.

The reference signal conversion unit $120_Y$ may convert the form of the reference illuminance into voltage or frequency via amplification of the reference illuminance sensed by the reference illuminance sensing unit $110_Y$ and output the converted reference illuminance to the reference control unit $130_Y$.

The reference control unit $130_Y$ generates a brightness control signal (hereinafter referred to as 'reference brightness control signal') using a sensed reference illuminance result. In this case, the aforementioned reference brightness may be proportional to the level of a reference brightness control signal. That is, the reference lighting device 200 may emit light having brightness corresponding to the level of a reference brightness control signal. In addition, the reference control unit $130_Y$ may transmit at least one of a reference illuminance and a reference brightness as the reference data to the object lighting control device $100_X$ in response to a request of the object lighting control device $100_X$.

The reference communication unit $140_Y$ and the reference antenna $150_Y$ serve to transmit a reference brightness control signal, generated by the reference control unit $130_Y$, to the reference lighting device 200.

Although only one reference lighting control device $100_Y$ is exemplarily shown in FIG. 2, at least one additional reference lighting control device $100_Y$ having a configuration as exemplarily shown in FIG. 2 among the first to $N^{th}$ lighting control devices $100_1$ to $100_N$ may be present. That is, the object lighting control device $100_X$ may refer to a plurality of reference lighting control devices $100_Y$.

Hereinafter, detailed operations of the object lighting control device $100_X$ and the reference lighting control device $100_Y$ will be described with reference to the accompanying drawings.

Figure 3:
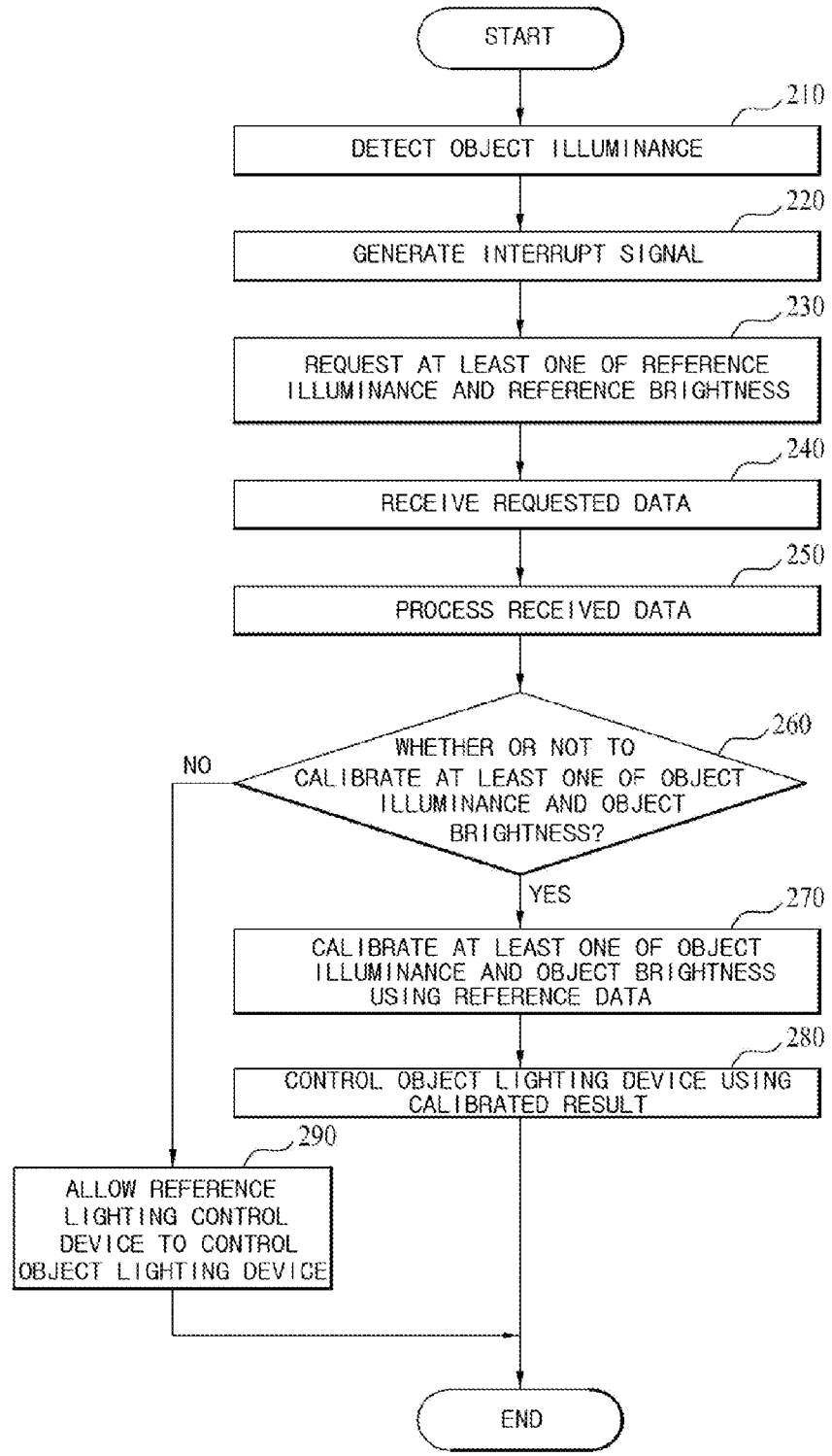
FIG. 3 is a flowchart explaining a lighting control method that is performed by the lighting control system according to an embodiment.

FIG. 3 is a flowchart explaining a lighting control method that is performed by the lighting control system according to an embodiment.

Referring to FIG. 3, an object illuminance is detected (Operation 210). To this end, the object illuminance sensing unit $110_X$ senses an object illuminance around the object lighting device 200, and the object signal conversion unit $120_X$ amplifies the sensed object illuminance into the form of voltage or frequency and outputs the amplifying result as the detected object illuminance to the object control unit $130_X$.

After Operation 210, the object control unit $130_X$ generates and transmits an interrupt signal to at least one reference lighting control device $100_Y$ through the object communication unit $140_X$ and the object antenna $150_X$ (Operation 220).

After Operation 220, the object control unit $130_X$ requests the at least one reference lighting control device $100_Y$ that permits the object lighting control device $100_X$ to access upon receiving the interrupt signal for reference data, i.e. at least one of a reference illuminance and a reference brightness (Operation 230). To this end, the object control unit $130_X$ may transmit a signal that requests for at least one of a reference illuminance and a reference brightness to the reference lighting control device $100_Y$ through the object communication unit $140_X$ and the object antenna $150_X$.

After Operation 230, the object control unit $130_X$ of the object lighting control device $100_X$ may receive reference data, i.e. at least one of a reference illuminance and a reference brightness, from the reference lighting control device $100_Y$ through the object communication unit $140_X$ and the object antenna $150_X$ (Operation 240).

After Operation 240, the object control unit $130_X$ may process the received reference data (operation 250). The object control unit $130_X$ may process the received reference data in various ways as follows.

The object control unit $130_X$ may receive a plurality of reference illuminances from a plurality of reference lighting control devices $100_Y$, and may calculate an average value of the plurality of received reference illuminances. Here, the average value may be used to calibrate an object illuminance in Operation 270.

Alternatively, the object control unit $130_X$ may calculate an average value of highest-frequency reference illuminances among a plurality of reference illuminances sensed by the plurality of reference lighting control devices $100_Y$. Here, the average value may be used to calibrate an object illuminance in Operation 270, and a plurality of highest-frequency reference illuminances may be present. For example, if a place where the reference lighting device 200 is located is temporarily affected by, e.g., a cloud or a shadow of the surrounding building, a plurality of reference illuminances may significantly differ from one another with deviations therebetween. In consideration of this fact, an object illuminance may be calibrated using the average value of the highest-frequency reference illuminances among the plurality of reference illuminances.

Additionally, the object control unit $130_X$ may receive a plurality of reference brightnesses output from a plurality of reference lighting control devices $100_Y$, and may calculate an average value of the plurality of received reference brightnesses. Here, the average value may be used to calibrate an object brightness in Operation 270.

Alternatively, the object control unit $130_X$ may calculate an average value of highest-frequency reference brightnesses among a plurality of reference brightnesses output from the plurality of reference lighting control devices $100_Y$. Here, the average value may be used to calibrate an object brightness in Operation 270, and a plurality of highest-frequency reference brightnesses may be present.

If object illuminance (or object brightness) is calibrated using a reference illuminance (or reference brightness), instead of the average value, in Operation 270, Operation 250 may be omitted.

After Operation 250, the object control unit $130_X$ judges whether or not to calibrate at least one of an object illuminance and an object brightness (Operation 260).

If foreign materials are present on a light receiving cover (not shown) of the object illuminance sensing unit $110_X$, a light receiving area of the object illuminance sensing unit $110_X$ may be reduced or blocked.

If the light receiving area is blocked by foreign materials, the object lighting control device $100_X$ may allow the reference lighting control device $100_Y$ to directly control the object lighting device 200, instead of calibrating at least one of an object illuminance and an object brightness (Operation 290). To this end, the object control unit $130_X$ generates and outputs a lighting control request signal to the reference lighting control device $100_Y$, and the reference lighting control device $100_Y$ transmits a reference brightness control signal serving as an object brightness control signal to the object lighting device 200 in response to the lighting control request signal. That is, the reference lighting control device $100_Y$ instead of the object lighting control device $100_X$ controls the object lighting device 200. In this case, when transmitting the lighting control request signal to the reference lighting control device $100_Y$, the object control unit $130_X$ may transmit an inherent identification signal of the reference lighting control device $100_Y$ to the object lighting device 200. This serves to allow the object lighting device 200 to be controlled by the reference lighting control device $100_Y$ corresponding to the received identification signal.

However, if it is recognized that the light receiving area is not blocked, but is reduced, the object control unit $130_X$ may calibrate at least one of an object illuminance and an object brightness (Operation 270).

To perform Operation 260, the object control unit $130_X$ may use at least one of an illuminance comparison result and a brightness comparison result. For example, if it is recognized from an illuminance comparison result that a difference between an object illuminance and a reference illuminance is continuously maintained for a predetermined duration or more, the object control unit $130_X$ may perform Operation 290 based on judgment that the light receiving area is blocked. In addition, if it is recognized from a brightness comparison result that a difference between an object brightness and a reference brightness is continuously maintained for a predetermined duration or more, the object control unit $130_X$ may perform Operation 290 based on judgment that the light receiving area is blocked. Although duration from sunset till sunrise in the summer season differs from duration from sunset till sunrise in the winter season, such difference is not over a predetermined duration. Accordingly, if a difference between an object illuminance and a reference illuminance or a difference between an object brightness and a reference brightness is continuously maintained for the predetermined duration or more, it may be judged that the light receiving area is blocked by foreign materials.

On the other hand, if it is recognized from an illuminance comparison result that a difference between an object illuminance and a reference illuminance is not continuously maintained for the predetermined duration or more, the object control unit $130_X$ may proceed to Operation 270 without generating a lighting control request signal based on judgment that the light receiving area is not blocked, but is reduced. In addition, if it is recognized from a brightness comparison result that a difference between an object brightness and a reference brightness is not continuously maintained for the predetermined duration or more, the object control unit $130_X$ may proceed to Operation 270 without generating a lighting control request signal based on judgment that the light receiving area is not blocked, but is reduced. If a difference between an object illuminance and a reference illuminance or a difference between an object brightness and a reference brightness is not continuously maintained for the predetermined duration or more, this means that the light receiving area is not blocked by foreign materials.

In a state in which the light receiving area is not blocked, the object control unit $130_X$ may calibrate at least one of an object illuminance and an object brightness using reference data (operation 270). That is, the object control unit $130_X$ may calibrate an object illuminance using a reference illuminance, and may calibrate an object brightness using a reference brightness.

Figure 4:
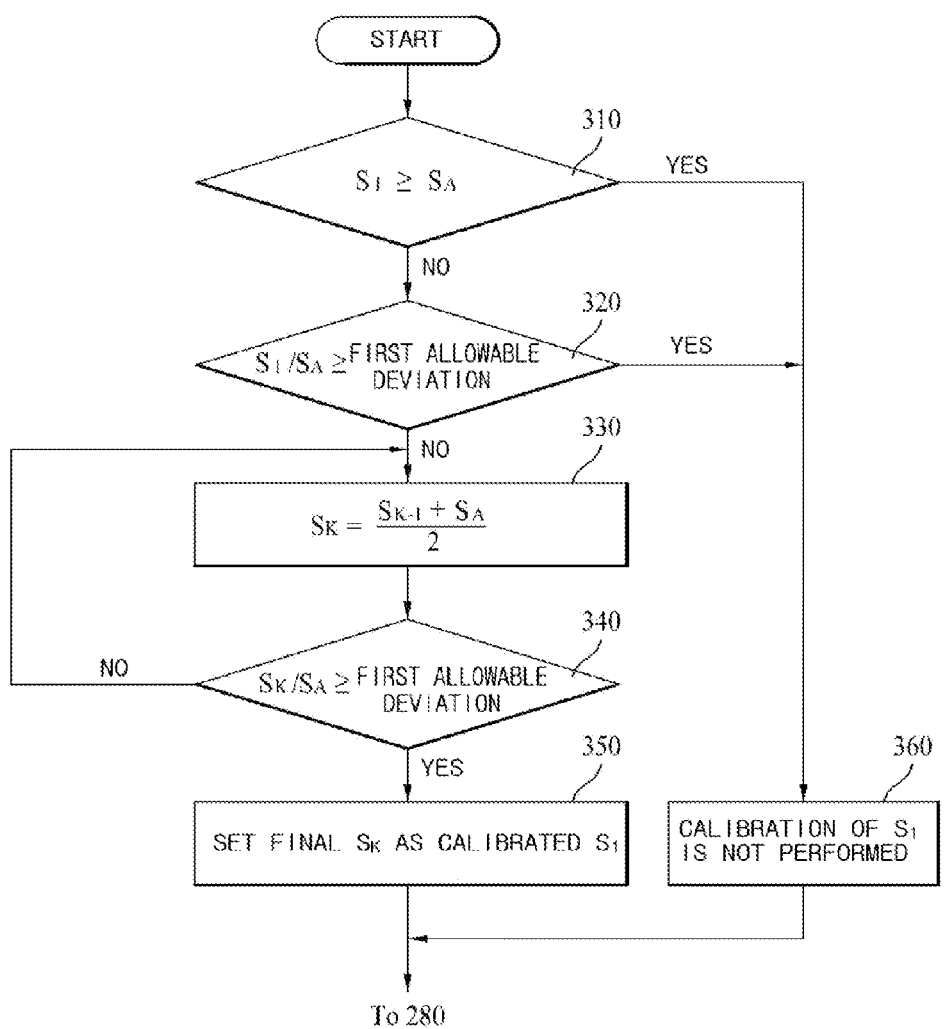
FIG. 4 is a flowchart explaining one embodiment of Operation 270 in FIG. 3.

FIG. 4 is a flowchart explaining one embodiment, designated by reference numeral 300, of Operation 270 in FIG. 3.

In the embodiment 300 as exemplarily shown in FIG. 4, the object control unit $130_X$ calibrates an object illuminance $S_1$ using a reference illuminance $S_A$ when an illuminance comparison result shows that a difference between the object illuminance $S_1$ and the reference illuminance $S_A$ diverges from a first allowable deviation range (Operations 310 to 360). Hereinafter, although the reference illuminance $S_A$ will be described as serving to calibrate the object illuminance $S_1$, the following description will be directly applied even in the case in which, instead of the reference illuminance $S_A$, an average value of a plurality of reference illuminances is used, or an average value of highest-frequency reference illuminances among a plurality of reference illuminances is used.

First, the object control unit $130_X$ judges whether or not a difference between the object illuminance $S_1$ and the reference illuminance $S_A$ diverges from the first allowable deviation range (Operations 310 and 320).

More specifically, the object control unit $130_X$ judges whether or not the object illuminance $S_1$ is equal to or greater than the reference illuminance $S_A$ (operation 310). If it is judged that the object illuminance $S_1$ is equal to or greater than the reference illuminance $S_A$, calibration of the object illuminance $S_1$ is not performed (Operation 360).

However, if it is judged that the object illuminance $S_1$ is less than the reference illuminance $S_A$, the object control unit $130_X$ judges whether or not a difference (or ratio) between the object illuminance $S_1$ and the reference illuminance $S_A$ diverges from the first allowable deviation range (Operation 320). Assuming that the lighting device 200 exemplarily shown in FIG. 1 is implemented by LEDs, the first allowable deviation range may be within a range of 0.9 to 0.99 because a lighting deviation rate of LEDs is approximately in a range of 0 to 10%.

That the object illuminance $S_1$ sensed by the object illuminance sensing unit $110_X$ is less than the reference illuminance $S_A$ sensed by the reference illuminance sensing unit $110_Y$ means that it is possible for the object illuminance sensing unit $110_X$ not to accurately sense an illuminance around the object lighting device 200 due to the influence of foreign materials, such as fallen leaves, bird guano, dust, or the like.

To accurately identify this possibility, a degree of the difference (or ratio) between the object illuminance $S_1$ and the reference illuminance $S_A$ is checked (Operation 320). To this end, as exemplarily shown in FIG. 4, it may be judged that a ratio of the object illuminance $S_1$ to the reference illuminance $S_A$ is a first allowable deviation or more, for example, is 0.99 or more (Operation 320).

If it is judged that a difference between the object illuminance $S_1$ and the reference illuminance $S_A$ is within the first allowable deviation range, calibration of the object illuminance $S_1$ is not performed (Operation 360). For example, assuming that the object illuminance $S_1$ is 0.999, the reference illuminance $S_A$ is 1, and the first allowable deviation is 0.99, the object illuminance $S_1$ is less than the reference illuminance $S_A$, but a value of $S_1/S_A$ is 0.999, greater than the first allowable deviation of 0.99, and therefore calibration of the object illuminance $S_1$ is not performed (Operation 360). As described above, that a difference between the object illuminance $S_1$ and the reference illuminance $S_A$ is within the first allowable deviation range and is close to the first allowable deviation means that a reduction in the light receiving area due to foreign materials, etc. is extremely slight, and thus a deviation of the object illuminance $S_1$ with respect to the reference illuminance $S_A$ is extremely slight. Therefore, calibration of the object illuminance $S_1$ is unnecessary.

However, if it is judged that a difference between the object illuminance $S_1$ and the reference illuminance $S_A$ diverges from the first allowable deviation range, the object illuminance $S_1$ is calibrated using the reference illuminance $S_A$ (Operations 330 to 350).

For example, the object control unit $130_X$ may calibrate the object illuminance $S_1$ by performing calculation as represented by the following Equation 1 at least one time until a deviation between an average value of the object illuminance $S_1$ and the reference illuminance and the reference illuminance enters the first allowable deviation range (Operation 330).

$$S_K = \frac{(S_{K-1} + S_A)}{2} \qquad \text{Equation 1}$$

Here, K is a positive integer of 1 or more, which corresponds to the implementation number of calculation of the aforementioned Equation 1 in order to acquire a calibrated object illuminance, and denotes a calibration number. In addition, $S_0(K=1)$ is $S_1$, and $S_K$ denotes a calibrated object illuminance.

It is judged whether or not a ratio of the calibrated object illuminance $S_1$, derived via calculation of Equation 1, to the reference illuminance $S_A$ is the first allowable deviation or more, for example, is 0.99 or more (Operation 340). As such, calculation of Equation 1 is successively performed K times until a value of $S_K/S_A$ becomes the first allowable deviation or more.

If the value of $S_K/S_A$ becomes the first allowable deviation or more, a value of $S_K$ acquired after performing calculation of Equation 1 K times is set to a final value of the calibrated object luminance (Operation 350).

Figure 5:
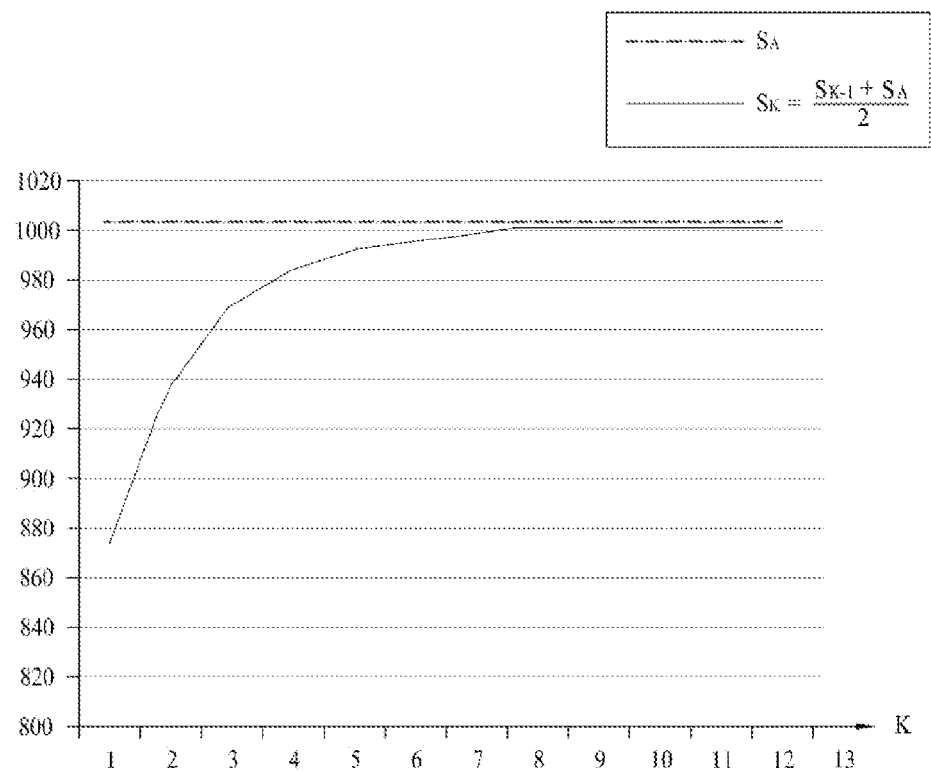
FIG. 5 is a graph showing a reference illuminance and a calibrated object illuminance with respect to a calibration number according to an embodiment.

FIG. 5 is a graph showing a reference illuminance $S_A$ and a calibrated object illuminance $S_K$ with respect to a calibration number K according to an embodiment.

For example, assuming that an average reference illuminance value is '1000' and an object illuminance $S_1$ sensed under the influence of foreign materials is '750', as exemplarily shown in Table 1, a difference between a calibrated object illuminance $S_K$ and a reference illuminance $S_A$ reaches the first allowable deviation, i.e. 0.99 when the object illuminance $S_{K-1}$ and the reference illuminance $S_A$ are calculated 5 times based on Equation 1 (that is, K=5).

First, the object control unit 130$_X$ judges whether or not the object brightness $B_1$ is equal to or less than the reference brightness $B_A$ (operation 410). If it is judged from the brightness comparison result that the object brightness $B_1$ is equal to or less than the reference brightness $B_A$, the object control unit 130$_X$ does not calibrate the object brightness $B_1$ (Operation 460). This is because if no foreign materials are present on the object illuminance sensing unit 110$_X$, an illuminance around the object lighting device 200 is accurately sensed and thus the object lighting device 200 does not unnecessarily remain powered-on, whereby the object brightness $B_1$ becomes the reference brightness $B_A$ or less.

However, if it is judged that the object brightness $B_1$ is greater than the reference brightness $B_A$, the object control unit 130$_X$ judges whether or not a difference between the object brightness $B_1$ and the reference brightness $B_A$ diverges from the second allowable deviation range (Operation 420). That the object brightness $B_1$ is greater than the reference brightness $B_A$ means that a brightness of the object lighting device 200 controlled by the object lighting control device 100$_X$ is greater than a brightness of the reference lighting device 200 controlled by the reference lighting control device 100$_Y$. This may mean that a light receiving area is reduced due to foreign materials present on the object illuminance sensing unit 100$_X$. For example, although the reference lighting

TABLE 1

| Calibration number (K) | Reference illuminance (SA) | Object illuminance to be calibrated (S1) | SK − 1 + SA | Calibrated object Illuminance (SK) (SK − 1 + SA)/2 | Deviation rate (%) |
| --- | --- | --- | --- | --- | --- |
| 1 | 1000 | 750 | 1750 | 875 | 87.5 |
| 2 | | | 1875 | 937.5 | 93.75 |
| 3 | | | 1937.5 | 968.75 | 96.875 |
| 4 | | | 1968.75 | 984.375 | 98.4375 |
| 5 | | | 1984.375 | 992.1875 | 99.21875 |
| 6 | | | 1992.188 | 996.09375 | 99.60938 |
| 7 | | | 1996.094 | 998.046875 | 99.80469 |
| 8 | | | 1998.047 | 999.0234375 | 99.90234 |
| 9 | | | 1999.023 | 999.5117188 | 99.95117 |
| 10 | | | 1999.512 | 999.7558594 | 99.97559 |
| 11 | | | 1999.756 | 999.8779297 | 99.98779 |
| 12 | | | 1999.878 | 999.9389648 | 99.9939 |

Referring to FIG. 5 and Table 1, it will be appreciated that the calibrated object illuminance $S_K$ approaches to the reference illuminance $S_A$ as the calibration number K increases.

Figure 6:
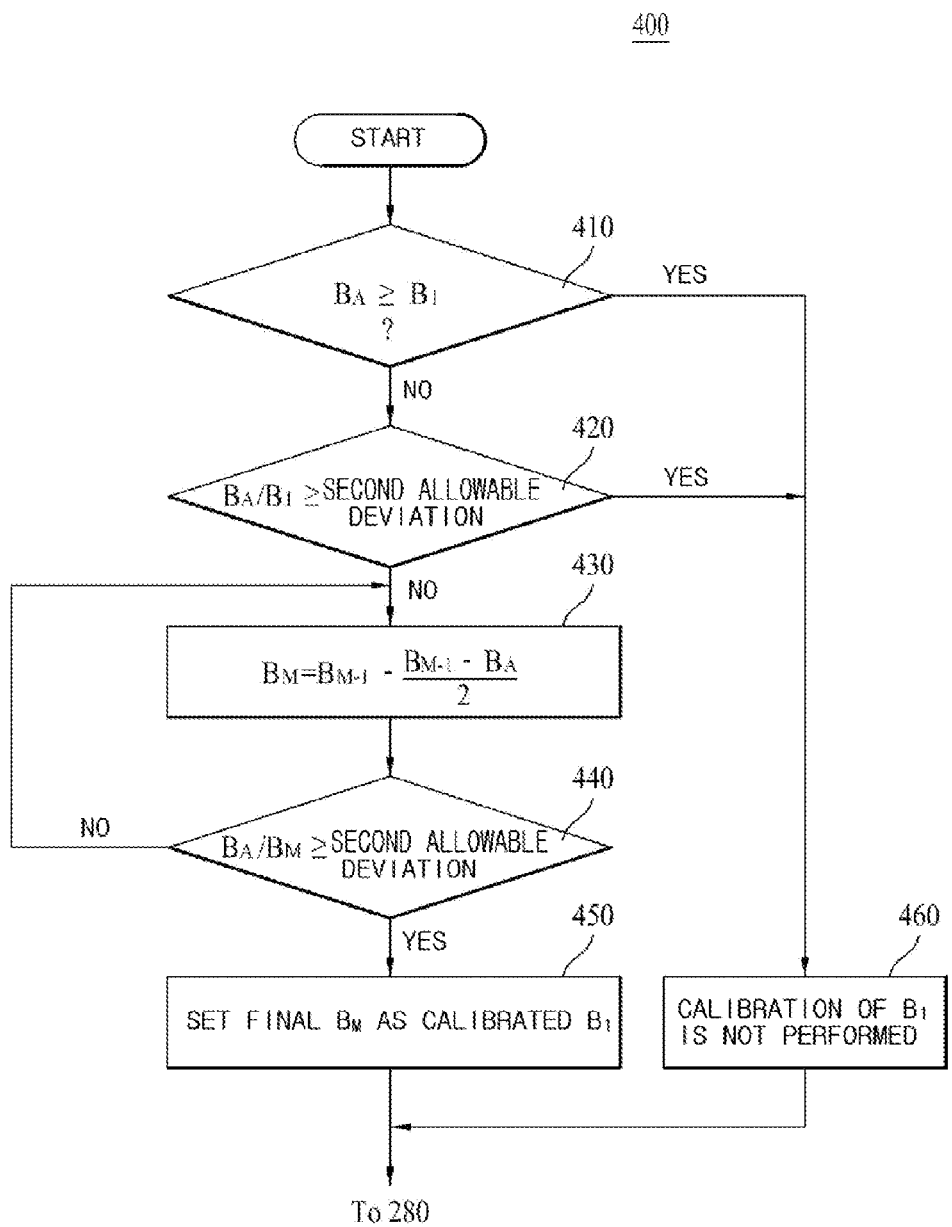
FIG. 6 is a flowchart explaining another embodiment of Operation 270 in FIG. 3.

FIG. 6 is a flowchart explaining another embodiment, designated by reference numeral 400, of Operation 270 in FIG. 3.

In the embodiment 400 as exemplarily shown in FIG. 6, the object control unit 130$_X$ calibrates an object brightness $B_1$ using a reference brightness $B_A$ when a brightness comparison result shows that a difference between the object brightness $B_1$ and the reference brightness $B_A$ diverges from a second allowable deviation range (Operations 410 to 460).

Hereinafter, although use of the reference brightness $B_A$ itself to calibrate the object brightness $B_1$ will be described, the following description will be directly applied even in the case in which, instead of the reference brightness $B_A$, an average value of a plurality of reference brightnesses is used, or an average value of highest-frequency reference brightnesses among a plurality of reference brightnesses is used.

First, the object control unit 130$_X$ judges whether or not a difference (or ratio) between the object brightness $B_1$ and the reference brightness $B_A$ diverges from the second allowable deviation range (Operations 410 and 420).

device 200 is turned off after sunrise, the object control unit 130$_X$ may keep the object lighting device 200 powered-on because the object illuminance sensing unit 110$_X$ has no ability to accurately sense an object illuminance due to foreign materials. As such, the object control unit 130$_X$ may detect the presence/absence of foreign materials by comparing a brightness of the object lighting device 200 with a brightness of the reference lighting device 200.

To judge whether or not a difference between the object brightness $B_1$ and the reference brightness $B_A$ diverges from the second allowable deviation range, as exemplarily shown in FIG. 6, the object control unit 130$_X$ judges whether or not a ratio of the reference brightness $B_A$ to the object brightness $B_1$ is equal to or greater than a second allowable deviation.

If it is judged that a difference between the object brightness $B_1$ and the reference brightness $B_A$ is within the second allowable deviation range, calibration of the object brightness $B_1$ is not performed (Operation 460). That a difference between the object brightness $B_1$ and the reference brightness $B_A$ is within the second allowable deviation range means that a deviation of the object brightness $B_1$ with respect to the reference brightness $B_A$ is extremely slight, in other words, the quantity of foreign materials is slight. Therefore, calibration of the object brightness $B_1$ is unnecessary.

For example, assuming that the object brightness $B_1$ is 1, an average reference brightness value $B_A$ is 0.999, and the second allowable deviation is 0.99, the object brightness $B_1$ is greater than the reference brightness $B_A$, but an error between $B_1$ and $B_A$, i.e. a value of $B_A/B_1$ is 0.999 that is greater than the second allowable range, i.e. 0.99, and therefore calibration of the object brightness $B_1$ is not performed (Operation 460).

However, if it is judged that a deviation between the object brightness $B_1$ and the reference brightness $B_A$ diverges from the second allowable deviation range, the object brightness $B_1$ is calibrated using the reference brightness $B_A$ (Operations 430 to 450).

The object control unit $130_X$ may calibrate the object brightness $B_1$ by performing calculation as represented by the following Equation 2 at least one time until a difference between a calibrated object brightness and a reference brightness enters the second allowable deviation range (Operations 430 and 440).

$$B_M = B_{M-1} - \frac{(B_{M-1} - B_A)}{2} \quad \text{Equation 2}$$

Here, M is a positive integer of 1 or more, which corresponds to the implementation number of calculation of the aforementioned Equation 2, and denotes a calibration number. In addition, $B_0$(M=1) is $B_1$, and $B_M$ denotes a calibrated object illuminance.

It is judged whether or not a ratio of the reference brightness $B_A$ to the object brightness $B_M$ calibrated by successively performing calculation of Equation 2 is the second allowable deviation or more, for example, is 0.99 or more (Operation 440). As such, calculation of Equation 2 is successively performed M times until a value of $B_A/B_M$ becomes the second allowable deviation or more.

If the value of $B_A/B_M$ becomes the second allowable deviation or more, a value of $B_M$ derived by performing calculation of Equation 2 M times is set to a final value of the calibrated object brightness (Operation 450).

Figure 7:
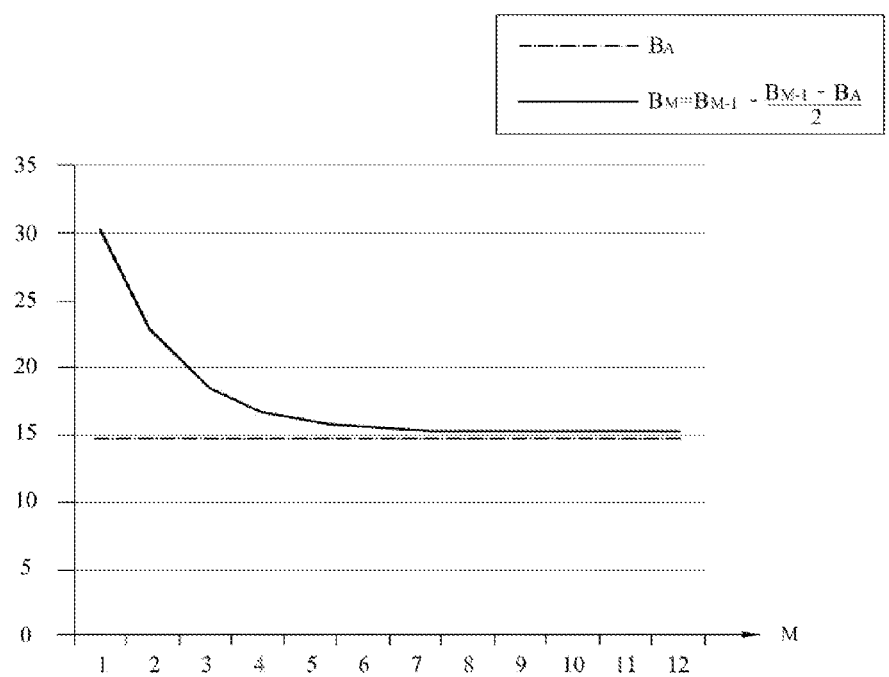
FIG. 7 is a graph showing a reference brightness and a calibrated object brightness with respect to a calibration number according to an embodiment.

FIG. 7 is a graph showing a reference brightness $B_A$ and a calibrated object brightness $B_M$ with respect to a calibration number M according to an embodiment.

For example, assuming that an average reference brightness value (hereinafter referred to as 'reference brightness') is '15' and an object brightness $B_1$ affected by foreign materials is '45', a deviation between a calibrated object brightness $B_M$ and the reference brightness $B_A$ reaches the second allowable deviation, i.e. 0.99 when the object brightness and the reference brightness $B_A$ are calculated 8 times based on Equation 2 (that is, M=8).

TABLE 2

| Calibration number (M) | Object brightness to be calibrated ($B_1$) | Reference brightness ($B_A$) | $B_{M-1} - B_A$ | $(B_{M-1} - B_A)/2$ | Calibrated object brightness ($B_M$) [($B_{M-1}$ − ($B_{M-1} - B_A$)/2)] | Deviation rate (%) |
|---|---|---|---|---|---|---|
| 1 | 45 | 15 | 30 | 15 | 30 | 66.66667 |
| 2 | | | 15 | 7.5 | 22.5 | 75 |
| 3 | | | 7.5 | 3.75 | 18.75 | 83.3333 |
| 4 | | | 3.75 | 1.875 | 16.875 | 90 |
| 5 | | | 1.875 | 0.9375 | 15.9375 | 94.44444 |
| 6 | | | 0.9375 | 0.46875 | 15.46875 | 97.05882 |
| 7 | | | 0.46875 | 0.234375 | 15.23438 | 98.48485 |
| 8 | | | 0.234375 | 0.1171875 | 15.11719 | 99.23077 |
| 9 | | | 0.117188 | 0.0859375 | 15.05859 | 99.6124 |
| 10 | | | 0.058594 | 0.029296875 | 15.0293 | 99.80545 |
| 11 | | | 0.029297 | 0.014648438 | 15.0465 | 99.90253 |
| 12 | | | 0.014648 | 0.007324219 | 15.00732 | 99.95122 |

Here, $B_0$ is 45.

Referring to FIG. 7 and Table 2, it will be appreciated that the calibrated object brightness $B_M$ approaches the reference brightness $B_A$ as the calibration number M increases.

Meanwhile, after Operation 270, the object control unit $130_X$ generates an object brightness control signal using at least one of the calibrated object illuminance and the calibrated object brightness, and controls the object lighting device 200 provided in the object district $200_X$ using the generated object brightness control signal (Operation 280). To this end, the object brightness control signal is transmitted to the object lighting device 200 of the object district $200_X$ through the object communication unit $140_X$ and the object antenna $150_X$. At least one object lighting device 200 provided in the object district $200_X$ may receive the object brightness control signal transmitted from the object lighting control device $100_X$. Then, the at least one object lighting device 200 may be turned on or off, or may adjust a brightness level thereof according to the received object brightness control signal. To this end, the lighting device 200 may be embodied in various ways.

Hereinafter, although an outer appearance, configuration, and operation of an embodiment, designated by reference numeral 500, of the lighting device 200 exemplarily shown in FIG. 1 will be described with reference to the accompanying drawings, of course, the embodiment is not limited thereto, and the lighting device 200 may be embodied in various ways.

Figure 8A:
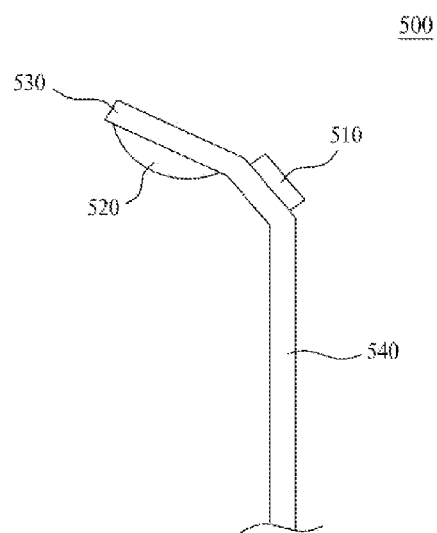
FIG. 8A is a view showing an outer appearance of an embodiment of an object or reference lighting device exemplarily shown in FIG. 1.
Figure 8B:
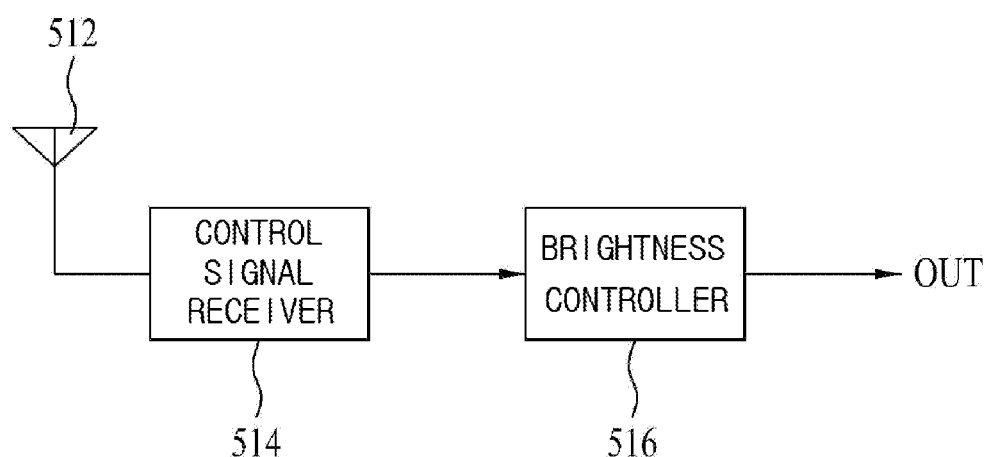
FIG. 8B is a block diagram schematically showing an embodiment of a control box exemplarily shown in FIG. 8A.

FIG. 8A is a view showing an outer appearance according to the embodiment 500 of the object or reference lighting device 200 exemplarily shown in FIG. 1, and FIG. 8B is a block diagram schematically showing an embodiment, designated by reference numeral 510A, of a control box 510 exemplarily shown in FIG. 8A.

As exemplarily shown in FIG. 8A, the object or reference lighting device 500 may be a street light. The lighting device 500 exemplarily shown in FIG. 8A may include a post 540, a plurality of solar cell modules 530 installed to an upper surface of an upper end of the post 540, the control box 510 to control the lighting device 500 upon receiving an object brightness control signal transmitted in a wired or wireless manner from the object lighting control device $100_X$, and a street light head 520 fixedly mounted to face the ground. A separate LED module (not shown) may be fitted inside a lower surface of the street light head 520.

Referring to FIG. 8B, the control box 510A of the lighting device 500 includes an antenna 512, a control signal receiver 514, and a brightness controller 516. The object brightness control signal transmitted from the object lighting control device 100$_X$ is received by the control signal receiver 514 through the antenna 512. In this case, the control signal receiver 514 stores an inherent identification number (hereinafter referred to as 'object identification number') of the object lighting control device 100$_X$, and judges whether or not the received object brightness control signal is transmitted from the object lighting control device 100$_X$ corresponding to the stored object identification number. This serves to ensure that the object lighting device 200, 500 is controlled only by the dedicated object lighting control device 100$_X$. To this end, a header of the object brightness control signal may be provided with the object identification number.

As described above, if the object lighting device 200, 500 is controlled by the reference lighting control device 100$_Y$ instead of the object lighting control device 100$_X$, an inherent identification number (hereinafter referred to as 'reference identification number') of the reference lighting control device 100$_Y$ is previously transmitted to the control signal receiver 514. Thus, when a reference brightness control signal, serving as the object brightness control signal, generated by the reference lighting control device 100$_Y$ is transmitted to the object lighting device 200, 500, the control signal receiver 514 judges whether or not the reference brightness control signal is transmitted from the reference lighting control device 100$_Y$ corresponding to the reference identification number. To this end, a header of the reference brightness control signal may be provided with the reference identification number.

The control signal receiver 514 removes noises that may be included in the received object brightness control signal or amplifies a signal level to thereby output the resulting signal to the brightness controller 516. The brightness controller 516 converts an output of the control signal receiver 514 into a signal suitable to drive the LED module, and outputs the converted signal to the LED module via an output terminal OUT.

The lighting device 500 as exemplarily shown in FIG. 8A acquires required power via the solar cell modules 530. The solar cell modules 530 are general items, and thus a detailed description thereof will be omitted herein. Instead of using the solar cell modules 530, the lighting device 500 may acquire power from any other natural energy, such as, for example, hydroelectric energy, wind power, wave power, tidal power, ocean thermal energy conversion, or combinations thereof. In addition, the lighting device 500 may receive required power from an alternative energy source, a fuel cell, or a commercial power source except for the enumerated natural energy sources.

Meanwhile, in the lighting control system as exemplarily shown in FIG. 2, the object lighting control device 100$_X$ may further include the object storage unit 132$_X$, and the reference lighting control device 100$_Y$ may further include the reference storage unit 132$_Y$. The object storage unit 132$_X$ stores the calibration number of at least one of an object illuminance and an object brightness. That is, the object storage unit 132$_X$ stores the implementation number of Operation 270. The number of times stored in the object storage unit 132$_X$ may be transmitted to a central control room (not shown) so as to be used later for management, such as maintenance/repair/cleaning of the object lighting device 200, for example.

The central control room may check the presence/absence of foreign materials in the object lighting control device 100$_X$ based on the implementation number of Operation 270, which may allow a corresponding lighting device to be cleaned upon regular inspection. In addition, checking the detection frequency of foreign materials in the object lighting control device 100$_X$ based on the implementation number of Operation 270 may ensure easy detection of the object lighting control device 100$_X$ having a high generation frequency of foreign materials, which may help removal or avoidance of the cause of frequent generation of foreign materials.

Meanwhile, if it is judged from at least one of an illuminance comparison result and a brightness comparison result that foreign materials are present in the object illuminance sensing unit 110$_X$, the lighting control system exemplarily shown in FIG. 2 may allow the reference lighting control device 100$_Y$ to control the object lighting device 200, rather than calibrating at least one of the object illuminance and the object brightness as described above with reference to FIG. 3.

Although the above description exemplifies calibration of an object illuminance using a reference illuminance, an object brightness of the object lighting device 200 may differ from a reference brightness of the reference lighting device 200 due to an error. Accordingly, embodiment 500 exemplarily shown in FIG. 6 may be performed after implementation of embodiment 400 exemplarily shown in FIG. 4.

Figure 9:
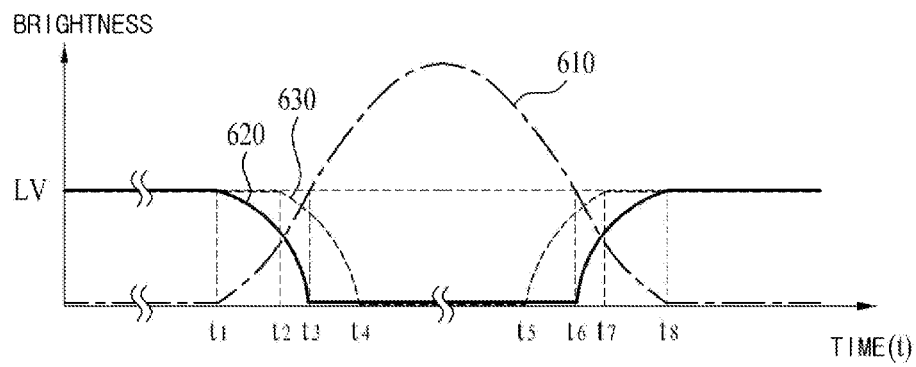
FIG. 9 is a graph respectively showing variation in hourly sunlight illuminance, variation in the normal brightness of a lighting device, and variation in the abnormal brightness of a lighting device.

FIG. 9 is a graph showing variation 610 in hourly sunlight illuminance, variation 620 in normal brightness of the lighting device 200, and variation 630 in abnormal brightness of the lighting device 200 by foreign materials. Although the following description is based on sunset or sunrise, of course, the following description is also applicable to an environment similar to sunset or sunrise.

If no foreign materials are present in the object illuminance sensing unit 110$_X$, the object lighting device 200 provided in the object district 200$_X$ is normally operated as follows.

Referring to FIG. 9, during nighttime $t_8 \sim t_1$ after the end of sunset $t_8$ and before the beginning of sunrise $t_1$, the object illuminance sensing unit 110$_X$ senses the lowest sunlight illuminance 610. In this case, the object control unit 130$_X$ generates an object brightness control signal in response to the sensed result of the object illuminance sensing unit 110$_X$, and the object lighting device 200 is turned on in response to the object brightness control signal, thereby emitting light so as to maintain a constant level of brightness LV around the object lighting device 200 (620).

During a sunrise duration $t_1 \sim t_3$ from a time point $t_1$ when sunrise begins till a time point $t_3$ when sunrise is completed, the object illuminance sensing unit 110$_X$ senses a gradually increasing sunlight illuminance 610. In this case, under control of the object brightness control signal generated from the object control unit 130$_X$, the object lighting device 200 emits gradually darker light so as to maintain a constant level of brightness LV around the object lighting device 200 (620).

In addition, during a sunset duration $t_6 \sim t_8$ from a time point $t_6$ when sunset begins till a time point $t_8$ when sunset is completed, the object illuminance sensing unit 110$_X$ senses a gradually decreasing sunlight illuminance 610. In this case, under control of the object brightness control signal generated from the object control unit 130$_X$, the object lighting device 200 emits gradually brighter light so as to maintain a constant level of brightness LV around the object lighting device 200 (620).

During daytime after the end of sunrise $t_3$ and before the beginning of sunset $t_6$, the object illuminance sensing unit 110$_X$ senses a sunlight illuminance 610. During the daytime, under control of the object brightness control signal generated by the object control unit $130_X$, the lighting device 200 is turned off without emission of light because a constant level of brightness LV is maintained around the object lighting device 200 by sunlight (620).

Meanwhile, if foreign materials are present in the object illuminance sensing unit $110_X$, the object lighting device 200 provided in the object district $200_X$ may be abnormally operated as follows.

During the sunrise duration $t_1 \sim t_3$ from the beginning to the end of sunrise, the object illuminance sensing unit $110_X$, a light receiving area of which is reduced due to foreign materials, retardedly senses variation in sunlight illuminance 610. Thereby, under control of the object control unit $130_X$, the object lighting device 200 emits gradually dimmer light starting from a time point $t_2$ that is slightly later than the time point $t_1$ (630). That is, the object lighting device 200 exhibits abnormal light emission for a duration $t_1 \sim t_2$. Moreover, the object lighting device 200 is turned off at a time point $t_4$ that is slightly later than the time point $t_3$. That is, the object lighting device 200 unnecessarily remains powered-on, rather than being turned off, for a duration $t_3 \sim t_4$, which results in excess power consumption.

In addition, if a light receiving area is reduced due to foreign materials adhered to a cover of the object illuminance sensing unit $110_X$, the object illuminance sensing unit $110_X$ may sense variation in sunlight illuminance 610 as if sunset begins, before the sunset duration from the beginning to the end of sunset $t_6 \sim t_8$. Thereby, under control of the object control unit $130_X$, the object lighting device 200 is turned on at a time point $t_5$ that is slightly earlier than the time point $t_6$ (630). That is, the object lighting device 200 may unnecessarily emit light for a duration $t_5 \sim t_6$, which results in excess power consumption. Moreover, the lighting device 200 emits gradually brighter light for a duration $t_5$ to $t_7$ so as to maintain a constant level of brightness LV around the object lighting device 200 (620). In this case, a time point when a brightness level begins to increase is slightly fast and thus a greater quantity of power than in the normal case is consumed for a duration $t_6 \sim t_7$.

According to an embodiment, the object lighting control device $100_X$ utilizes reference data as well as an object illuminance in order to generate an object brightness control signal for control of the object lighting device 200. Accordingly, as described above with reference to FIG. 9, it is possible to prevent unnecessary power consumption and reduction in the lifespan of the object lighting device 200 caused when the object lighting device 200 emits light for an increased duration as the object illuminance sensing unit $110_X$ senses variation in sunlight illuminance 610 early or late due to foreign materials.

Figure 10:
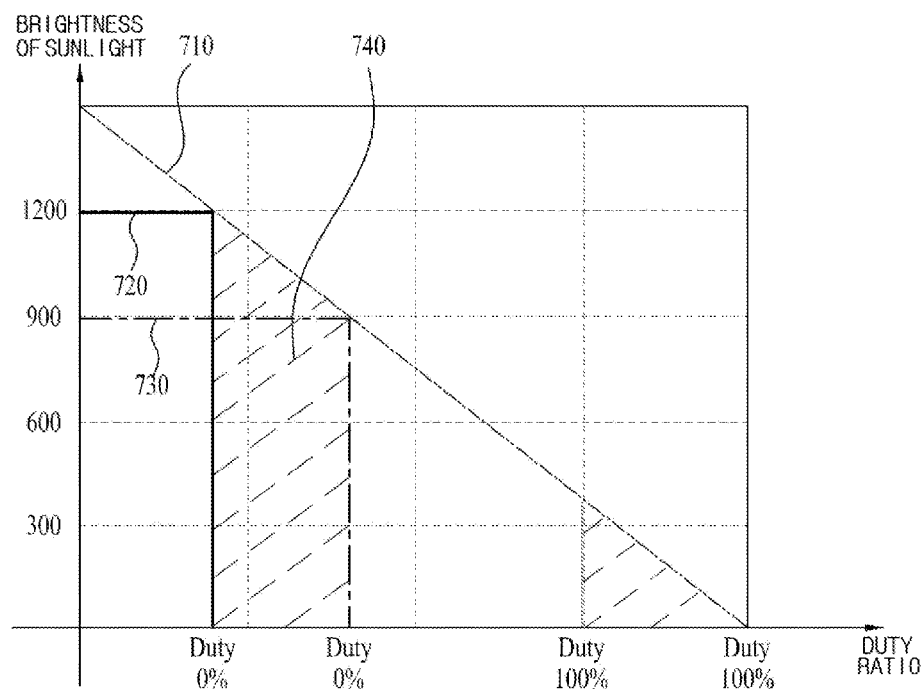
FIG. 10 is a graph showing a relationship between a duty ratio of a PWM object brightness control signal and brightness of sunlight.

FIG. 10 is a graph showing a relationship between a duty ratio of a PWM object brightness control signal and brightness of sunlight.

Referring to FIGS. 9 and 10, assuming that the object illuminance sensing unit $110_X$ has no foreign materials and brightness of sunlight 710 is '900' (t=$t_6$), the object lighting control device $100_X$ generates an object brightness control signal 730 at the time point $t_6$ that is later than the time point $t_5$ (Duty 0%), so as to allow the object lighting device 200 to emit light.

On the other hand, assuming that the object illuminance sensing unit $110_X$ has foreign materials and brightness of sunlight 710 is '1200' (t=$t_5$), the object lighting control device $100_X$ generates an object brightness control signal 720 (Duty 0%) so as to allow the object lighting device 200 to emit light. As such, if a light receiving area is reduced by approximately 33% due to foreign materials as compared to the normal case, abnormal operation of the object lighting device 200 causes unnecessary power consumption as represented by an area 740 in the graph.

Figure 11:
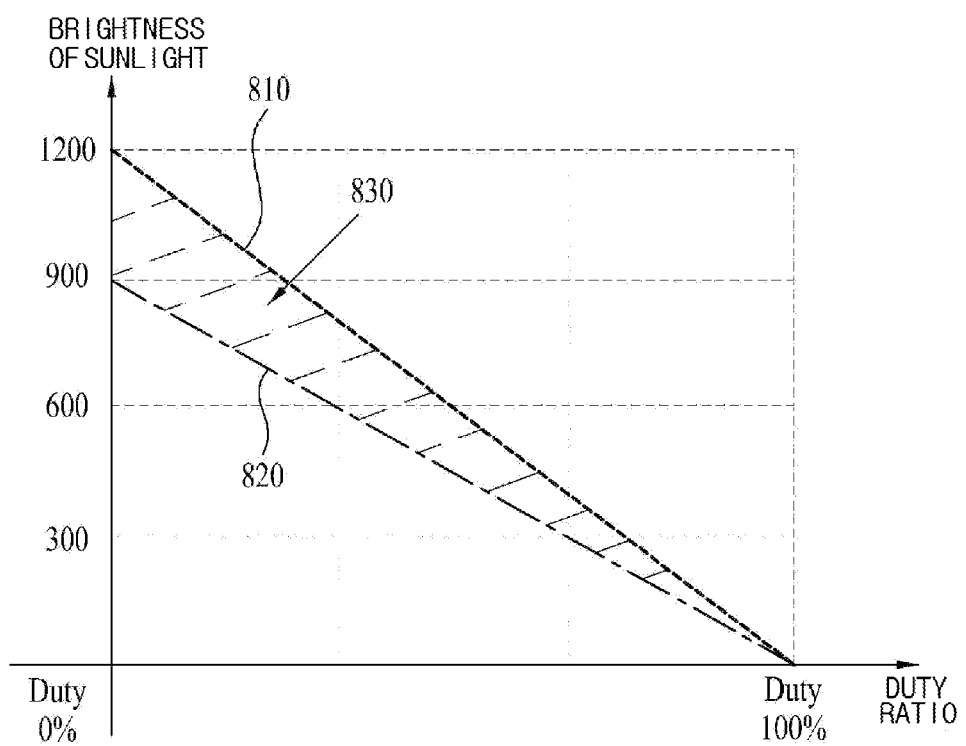
FIGS. 11 and 12 are graphs showing a relationship between a duty ratio of a PWM object brightness control signal and brightness of sunlight.
Figure 12:
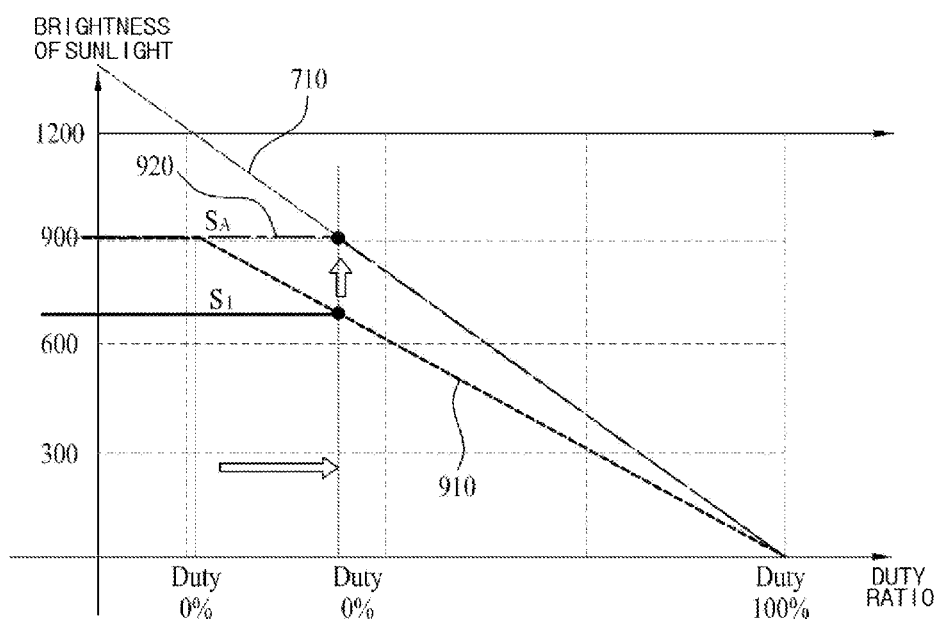

FIGS. 11 and 12 are graphs showing a relationship between a duty ratio of a PWM object brightness control signal and brightness of sunlight.

Referring to FIG. 11, it will be appreciated that the presence of impurities causes the object lighting device 200 to be abnormally operated by a striped area 830 in the graph due to a difference between an object illuminance 810 sensed by the object illuminance sensing unit $110_X$ and a reference illuminance 820 sensed by the reference illuminance sensing unit $110_Y$, which results in unnecessary power consumption.

On the other hand, referring to FIG. 12, if an object illuminance $S_1$ 910 output from the object illuminance sensing unit $110_X$ in which foreign materials are present is calibrated using a reference illuminance $S_A$ 920, it is possible to prevent abnormal operation of the object lighting device 200 because a duty ratio of the object brightness control signal moves from 0% in an arrow direction.

As is apparent from the above description, an object lighting control device of a lighting control system according to an embodiment may accurately control an object lighting device by referring to a reference lighting control device in the case in which a light receiving area of an illuminance sensing unit is reduced or blocked due to foreign materials, which may prevent unnecessary power consumption, and result in increased lifespan of the object lighting device and maintenance/repair cost savings.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting control system, comprising:
    an object lighting control device that generates an object brightness control signal to control an object brightness of an object lighting device provided in an object district using a sensed result of an object illuminance around the object lighting device and using reference data; and
    at least one reference lighting control device that generates a reference brightness control signal to control a reference brightness of a reference lighting device provided in a reference district using a sensed result of a reference illuminance around the reference lighting device, and that transmits at least one of the reference illuminance and the reference brightness as the reference data to the object lighting control device in response to a request of the object lighting control device.

2. The lighting control system according to claim 1, wherein the object lighting control device calibrates at least one of the object illuminance and the object brightness using at least one of an illuminance comparison result between the object illuminance and the reference illuminance and a brightness comparison result between the reference brightness and the object brightness, and
    wherein the object lighting control device generates the object brightness control signal using at least one of the calibrated object illuminance and object brightness.

3. The lighting control system according to claim 2, wherein the object lighting control device calibrates the object illuminance using the reference illuminance when the illuminance comparison result shows that a difference between the object illuminance and the reference illuminance diverges from a first allowable deviation range.

4. The lighting control system according to claim 3, wherein the object lighting control device calibrates the object illuminance by performing the following calculation at least one time until a deviation between (i) an average value of the object illuminance and the reference illuminance and (ii) the reference illuminance enters the first allowable deviation range;

$$S_K = \frac{(S_{K-1} + S_A)}{2}$$

(where, K is a positive integer of 1 or more, which corresponds to the implementation number of the above calculation and denotes a calibration number, Sic denotes the calibrated object illuminance, and $S_0(K=1)$ is the object illuminance to be calibrated, and $S_A$ denotes the reference illuminance).

5. The lighting control system according to claim 3, wherein the at least one reference lighting control device includes a plurality of reference lighting control devices, and
wherein the object lighting control device calibrates the object illuminance using an average value of a plurality of reference illuminances sensed by the plurality of reference lighting control devices.

6. The lighting control system according to claim 3, wherein the at least one reference lighting control device includes a plurality of reference lighting control devices, and
wherein the object lighting control device calibrates the object illuminance using an average value of highest-frequency reference illuminances among a plurality of reference illuminances sensed by the plurality of reference lighting control devices.

7. The lighting control system according to claim 2, wherein the object lighting control device calibrates the object brightness using the reference brightness if the brightness comparison result shows that a difference between the object brightness and the reference brightness diverges from a second allowable deviation range.

8. The lighting control system according to claim 7, wherein the object lighting control device calibrates the object brightness by performing the following calculation at least one time until a difference between the calibrated object brightness and the reference brightness enters the second allowable deviation range;

$$B_M = B_{M-1} - \frac{(B_{M-1} - B_A)}{2}$$

(where, M is a positive integer of 1 or more, which corresponds to the implementation number of the above calculation and denotes a calibration number, $B_M$ denotes the calibrated object illuminance, $B_0(M=1)$ denotes the object brightness to be calibrated, and $B_A$ denotes the reference brightness).

9. The lighting control system according to claim 7, wherein the at least one reference lighting control device includes a plurality of reference lighting control devices, and
wherein the object lighting control device calibrates the object brightness using an average value of a plurality of reference brightnesses output from the plurality of reference lighting control devices.

10. The lighting control system according to claim 7, wherein the at least one reference lighting control device includes a plurality of reference lighting control devices, and
wherein the object lighting control device calibrates the object brightness using an average value of highest-frequency reference brightnesses among a plurality of reference brightnesses output from the plurality of reference lighting control devices.

11. The lighting control system according to claim 2, wherein the object lighting control device transmits a lighting control request signal in response to at least one of the illuminance comparison result and the brightness comparison result, and
wherein the reference lighting control device transmits the reference brightness control signal as the object brightness control signal to the object lighting device in response to the lighting control request signal.

12. The lighting control system according to claim 11, wherein the object lighting control device transmits an inherent identification signal of the reference lighting control device to the object lighting device when transmitting the lighting control request signal to the reference lighting control device, and
wherein the object lighting device allows control by the reference lighting control device that is recognized based on the identification signal.

13. The lighting control system according to claim 1, wherein the object lighting control device includes:
an object illuminance sensing unit configured to sense the object illuminance;
an object control unit configured to generate the object brightness control signal using the sensed object illuminance and the reference data; and
an object communication unit configured to transmit the object brightness control signal to the object lighting device.

14. The lighting control system according to claim 13, wherein the object lighting control device further includes an object signal conversion unit that amplifies the object illuminance sensed by the object illuminance sensing unit and convert a form of the object illuminance into a form of voltage or frequency and that outputs the converted object illuminance, and
wherein the object control unit generates the object brightness control signal using the converted object illuminance and the reference data.

15. The lighting control system according to claim 13, wherein the object control unit generates the object brightness control signal in the form of a pulse width modulation signal.

16. The lighting control system according to claim 13, wherein the object lighting control device further includes a storage unit configured to store an implementation number of calibration of at least one of the object illuminance and the object brightness.

17. The lighting control system according to claim 16, wherein the lighting control system manages the object lighting device using the implementation number of calibration stored in the storage unit.

18. The lighting control system according to claim 1, wherein the reference lighting control device includes:

a reference illuminance sensing unit configured to sense the reference illuminance;

a reference control unit configured to generate the reference brightness control signal using the sensed reference illuminance; and a reference communication unit configured to transmit the reference brightness control signal to the reference lighting device.

19. The lighting control system according to claim 18, wherein the reference lighting control device further includes a reference signal conversion unit that amplifies the reference illuminance sensed by the reference illuminance sensing unit and converts a form of the reference illuminance into a form of voltage or frequency and that outputs the converted reference illuminance, and wherein the reference control unit generates the reference brightness control signal using the converted reference illuminance.

20. A lighting control system comprising:

an object lighting control device that generates a lighting control request signal using a sensed result of an object illuminance around an object lighting device provided in an object district and using reference data; and a reference lighting control device that generates a reference brightness control signal to control a reference brightness of a reference lighting device provided in a reference district using a sensed result of a reference illuminance around the reference lighting device, and that outputs the reference brightness control signal as an object brightness control signal to control a brightness of the object lighting device to the object lighting control device in response to the lighting control request signal received from the object lighting control device.

* * * * *